United States Patent [19]

Katagiri et al.

[11] Patent Number: 4,789,113

[45] Date of Patent: Dec. 6, 1988

[54] HUB LOCKING MECHANISM IN A MAGNETIC TAPE CASSETTE

[75] Inventors: Shingo Katagiri; Kengo Oishi, both of Kanagawa, Japan

[73] Assignee: Fuji Photo Film Co., Ltd., Kanagawa, Japan

[21] Appl. No.: 110,315

[22] Filed: Oct. 20, 1987

[30] Foreign Application Priority Data

Oct. 20, 1986 [JP] Japan ............... 61-159479[U]
Oct. 27, 1986 [JP] Japan ............... 61-163503[U]

[51] Int. Cl.⁴ .................................. G11B 23/087
[52] U.S. Cl. ............................ 242/198; 360/132
[58] Field of Search .................... 242/197–200; 360/132

[56] References Cited

U.S. PATENT DOCUMENTS 4,646,190  2/1987  Meguro ........................ 360/132
4,678,138  7/1987  Nemoto ...................... 360/132 X
4,697,702 10/1987  Urayama .................... 360/132 X Primary Examiner—David Werner
Attorney, Agent, or Firm—Sughrue, Mion, Zinn, Macpeak and Seas

[57] ABSTRACT

A magnetic tape cassette in which a locking member is slidably biased away from a front opening of the cassette to lock the tape hubs. The locking member has a pair of side arms interlocked with a front panel of the cassette so that, when the panel is rotated open, the locking member disengages from the hubs.

4 Claims, 2 Drawing Sheets

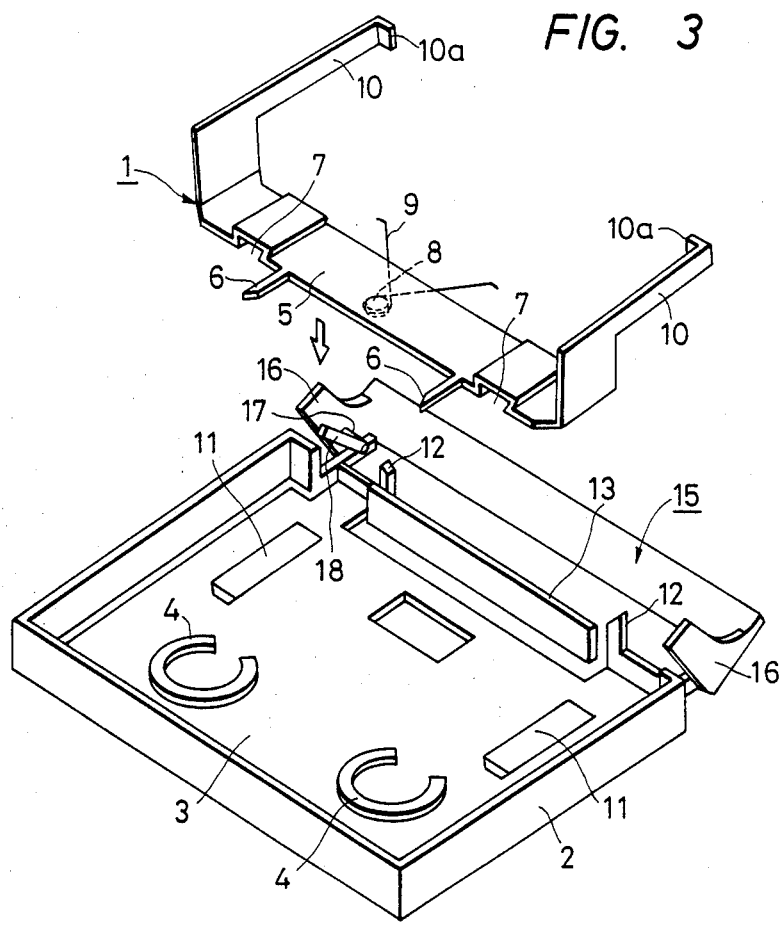

HUB LOCKING MECHANISM IN A MAGNETIC TAPE CASSETTE

BACKGROUND OF THE INVENTION

1. Field of the Invention

The present invention relates to a magnetic tape cassette. It particularly relates to an original compact magnetic tape cassette whose size is not larger than that of the magnetic tape cassette of the Philips type and which is used for audio equipment or the like.

2. Background of the Invention

Since the size and weight of a cassette tape recorder has recently been reduced, the use of a compact magnetic tape cassette recorder for this reduced-sized cassette tape is spreading. At the same time, it is being strongly desired that a magnetic tape cassette appropriate for long-length recording and reproduction of high quality and density be available in the field of audio technology. There is known a magnetic tape cassette so as to achieve the above desire. This tape cassette uses digital recording and reproduction, which are performed through the pulse conversion of an input signal by pulse code modulation in contrast with analog recording and reproduction.

A large video tape cassette for digital recording and reproduction has generally become popular. In this large tape cassette, the frequency band is made wider than that for a conventional compact audio tape cassette because the frequency band needs to be made about five times as great as that for the conventional compact audio tape cassette. Except in some special cases, the large video tape cassette is matched with a rotary head system. The large video tape cassette has such a construction that a guard panel openable from the cassette is provided on the cassette to close its front opening because sufficient tape protection measures for higher reliability become necessary to perform high-density and wide-frequency-band digital recording and reproduction in which the wavelength of a recorded signal is shorter than that for the conventional compact audio tape cassette.

A very compact magnetic tape cassette, which meets the above mentioned desire, is suitable for audio recording and reproduction or the like. The frequency band for this very compact cassette is relatively wide as well as that for the large video tape cassette. Since the very compact magnetic tape cassette is not larger than the conventional compact audio tape cassette, the very compact magnetic tape cassette is expected to be carried outdoors at least as often as the conventional compact audio tape cassette. For that reason, the very compact magnetic tape cassette needs to have such a construction as to surely prevent the jamming of a magnetic tape due to its looseness which would be caused by its carrying or the like.

In such a very compact magnetic tape cassette proposed to have the above-described construction, a locking member is provided so that hubs on which a magnetic tape is wound are locked out of use and are unlocked during use. The locking member is always urged toward the hubs by a spring. When the magnetic tape is out of use, sharp-pointed projections provided on the locking member are located in contact with the hubs to keep the hubs from rotating. When the magnetic tape is in use, the sharp-pointed projections are separated from the hubs. However, as the component parts of the cassette are made smaller to render it compact, it becomes less easy to assemble the component parts. Since the locking member is urged by the spring when the locking member is attached in the assembly, it is troublesome to handle the locking member and the efficiency of the assembly is therefore degraded. Furthermore, the locking member is always urged toward the hubs (rearward of to the cassette) by the spring to lock the hubs. But, when the locking member is slid forward of the cassette through engagement with the guard panel at the time of opening of guard panel to unlock the hubs, the locking member is elastically deformed to make it unsure that the locking member is engaged with the guard panel. These are problems.

SUMMARY OF THE INVENTION

The present invention was made in order to solve the above-mentioned problems.

Accordingly, it is an object of the present invention to provide a magnetic tape cassette whose assembling property is improved and in which the locking and unlocking of hubs are made reliable.

In the magnetic tape cassette of the invention, a magnetic tape is wound on a pair of hubs. A slidable locking member is urged by a spring to lock the hubs. A rotatable guard panel opens and closes the front opening of the cassette.

A first aspect of the magnetic tape cassette is characterized in that the tip portions of a pair of arms belonging to the locking member and extending forward of the cassette have a receptacle-like engagement portion open at least on their upper sides. Thereof L-shaped engagement hooks are provided on the inside surfaces of both the side walls of the guard panel so that the tips of the hooks can be engaged in the receptacle-like engagement portions. The engagement hooks are engaged in the receptacle-like engagement portions by the opening motion of the guard panel to slide the locking member forward of the cassette.

A second aspect of the magnetic tape cassette of the invention is characterized in that the tip claws of a pair of the cassette locking member arms project inwardly of the cassette. Engagement hooks are provided on the inside surfaces of both the side walls of the guard panel and are located further to the inside the cassette, than the arms. The engagement hooks are engaged on the tip claws by the opening motion of the guard panel to slide the locking member forward of to the cassette.

Since, according to the first aspect, the locking member which is attached to the upper half case section of each of the magnetic tape cassettes of the present invention is urged rearward as to the cassette by the spring, the locking member can surely be kept displaced forward of the cassette by the guard panel so that the locking member is prevented from coming into contact with the hubs at the time of assembly of the cassette. Thus, a trouble such as the deviation of the positions of the hubs can be eliminated to facilitate the assembly of the cassette. For that reason, it is made easier to automate the assembly of the cassette to enhance the productivity.

According to the second aspect, the locking member and the guard panel are engaged with each other by inserting the engagement hooks into the engagement tip portions of the arms of the locking member or sandwiching the arms between the engagement hooks and the side walls of the guard panel. Therefore, lateral movement of the locking member in the rightward and leftward directions of each of the magnetic tape cassettes provided in accordance with the present invention is restricted. Accordingly troubles such as the unexpected disengagement of the engagement hooks and the locking member are thoroughly prevented to ensure the proper operation of the locking member.

BRIEF DESCRIPTION OF THE DRAWINGS

FIG. 3 shows a perspective exploded view of the upper half case section, locking member and guard panel of a magnetic tape cassette which is the second embodiment of the present invention.

FIG. 4 shows a perspective enlarged view of a major part of the magnetic tape cassette shown in FIG. 3, to indicate the state of engagement of the locking member and the guard panel.

FIG. 5 shows a perspective enlarged view of a major part of another embodiment of the present invention.

DETAILED DESCRIPTION OF EXEMPLARY EMBODIMENTS

Embodiments of the present invention are hereafter described with reference to the drawings.

Figure 1:
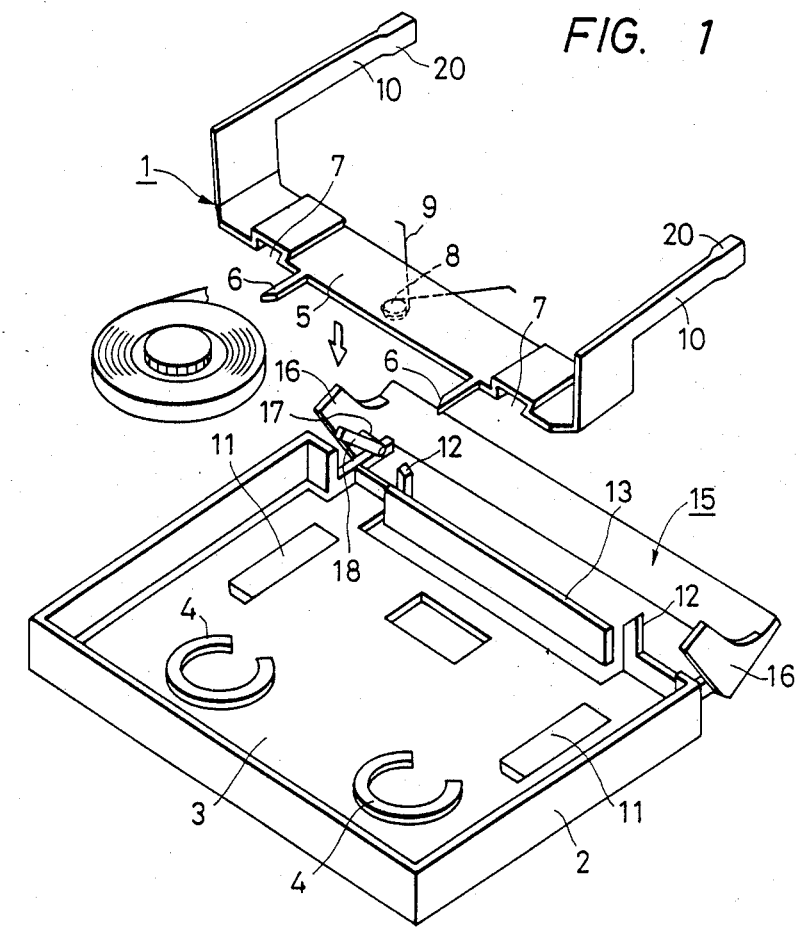
FIG. 1 shows a perspective exploded view of the upper half case section, locking member and guard panel of a magnetic tape cassette which is the first embodiment of the present invention.
Figure 2:
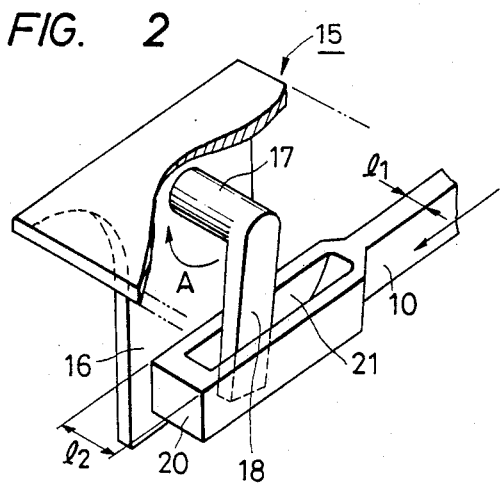
FIG. 2 shows a perspective enlarged view of a major part of the magnetic tape cassette to indicate the state of engagement of the locking member and the guard panel.

FIGS. 1 and 2 show the first embodiment which is a magnetic tape cassette.

FIG. 1 shows an exploded perspective view of the state of the magnetic tape cassette, in which a locking member 1 is not yet attached to an upper half casing section 2. A window member 3 is secured to the upper half case section 2 by ultrasonic fuse-bonding or the like. The window member 3 has a pair of support rims 4 located near the rear of the magnetic tape cassette to support the upper edges of two hubs not shown in the drawings. The window member 3 has a pair of narrow projections 11 located near the front of the cassette and extending in the front-to-rear direction of the cassette. Optical prisms 12 are provided on a pair of projecting portions of the window member 3, which extend to the tape passage ports of the front of the cassette for detecting the ends of the tape.

The locking member 1 has a flat portion 5, which slides on the window member 3 and includes a pair of recesses 7, in which the projections 11 are fitted. A pair of sharp-pointed backward projections 6 on the locking member are brought into contact with the peripheral edges of the hubs. A spring 9 for urging the locking member rearward of the magnetic tape cassette is fitted on a protrusion 8. The locking member 1 has arms 10 located at both its right and left sides which extend forward of the cassette casing section 2, along its side walls. The tip portions of the arms 10 act as engagement portions 20 having receptacle-like receivers 21, shown in FIG. 2. Although a width $l_1$ of the main portion of each arm 10 in the right-to-left direction of the magnetic tape cassette is relatively small, it is preferable that the width $l_2$ of each engagement portion 20 in that direction is large enough to make it easy to include the receivers 21 within that width $l_2$.

Returning to FIG. 1, a guard panel 15 for opening and closing the front opening of the magnetic tape cassette is supported so that the guard panel can be turned about turning shafts 17 provided on both the side walls 16 of the guard panel 15. Engagement hooks 18 appropriately extend from the tips of the turning shafts 17 nearly in parallel with the guard panel side walls 16.

When the magnetic tape cassette is assembled, the locking member 1 and the front panel 15 engaged with it are attached to the upper half case section 2 and this case section 2 is then overlaid on a lower half case section 2 in which both the hubs, a magnetic tape wound thereon, a friction sheet and so forth are already assembled. At that time, the locking member 1 is supported by the fit of the projections 11 of the case section 2 in the recesses 7 of the locking member 1 so that the locking member 1 can be slid along the upper half case section 2 backward and forward of the cassette. At the same time, the upper half case section 2 can be attached to the lower half case section as the locking member 1 remains slid forward despite the urging force of the spring 9 against a front wall 13 because the locking member 1 is linked to the guard panel 15 attached to the front portion of the upper half case section 2. In other words, the locking member 1 and the guard panel 15 have such constitution and operation, shown in FIG. 2, that the engagement hooks 18 provided on the turning shafts 17 are engaged with the engagement portions 20 of the arms 10. When the guard panel 15 in turned in the direction A so as to open, it slides the locking member 1 forward of the cassette 2. For that reason, when the upper half case section 2 is overlaid on the lower half case section in the assembly of the magnetic tape cassette, the sharp-pointed projections 6 of the locking member 1 are not engaged on the hubs, so that the hubs are not displaced by the unexpected engagement of the sharp-pointed projections on the hubs. The asembling property of the magnetic tape cassette is thereby improved. The assembly of the cassette is thus simplified to make it easy to assemble the cassette by using an automatic machine in particular, to enhance the productivity.

The operation of the locking member 1 mounted in the magnetic tape cassette is now described. When the cassette is loaded in a recording/reproduction device so that the guard panel 15 at the front of the cassette is turned, the locking member 1 is slid forward by the engagement of its engagement hooks 18 in the engagement portions 20 of the arms 10, against the opposing rearward urging force of the spring 9 on the front wall 13 of the upper half case section 2, to thereby unlock the hubs. When the locking member 1 is being slid forward and when the hubs are unlocked from the locking member, a tensile force acts between the tip portion of each arm 10 of the locking member and the spring protrusion 8 thereof. A component of the tensile force acts as if it would deform the locking member 1. However, since each engagement hook 18 is located in the engagement portion 20 of the arm 10 as shown in FIG. 2, a trouble such as the unexpected disengagement of the engagement portion 20 from the engagement hook 18 is prevented to ensure the proper operation of the locking member 1.

FIGS. 3 and 4 shows the second embodiment of the magnetic tape cassette. The same reference symbols in FIGS. 1, 2, 3 and 4 denote the same component parts. The difference of the second embodiment from the first embodiment if that the tip end portions of both the arms 10 of the locking member 1 are provided with claws 10a oriented inward in the second embodiment.

HUB LOCKING MECHANISM IN A MAGNETIC TAPE CASSETTE

BACKGROUND OF THE INVENTION

1. Field of the Invention

The present invention relates to a magnetic tape cassette. It particularly relates to an original compact magnetic tape cassette whose size is not larger than that of the magnetic tape cassette of the Philips type and which is used for audio equipment or the like.

2. Background of the Invention

Since the size and weight of a cassette tape recorder has recently been reduced, the use of a compact magnetic tape cassette recorder for this reduced-sized cassette tape is spreading. At the same time, it is being strongly desired that a magnetic tape cassette appropriate for long-length recording and reproduction of high quality and density be available in the field of audio technology. There is known a magnetic tape cassette so as to achieve the above desire. This tape cassette uses digital recording and reproduction, which are performed through the pulse conversion of an input signal by pulse code modulation in contrast with analog recording and reproduction.

A large video tape cassette for digital recording and reproduction has generally become popular. In this large tape cassette, the frequency band is made wider than that for a conventional compact audio tape cassette because the frequency band needs to be made about five times as great as that for the conventional compact audio tape cassette. Except in some special cases, the large video tape cassette is matched with a rotary head system. The large video tape cassette has such a construction that a guard panel openable from the cassette is provided on the cassette to close its front opening because sufficient tape protection measures for higher reliability become necessary to perform high-density and wide-frequency-band digital recording and reproduction in which the wavelength of a recorded signal is shorter than that for the conventional compact audio tape cassette.

A very compact magnetic tape cassette, which meets the above mentioned desire, is suitable for audio recording and reproduction or the like. The frequency band for this very compact cassette is relatively wide as well as that for the large video tape cassette. Since the very compact magnetic tape cassette is not larger than the conventional compact audio tape cassette, the very compact magnetic tape cassette is expected to be carried outdoors at least as often as the conventional compact audio tape cassette. For that reason, the very compact magnetic tape cassette needs to have such a construction as to surely prevent the jamming of a magnetic tape due to its looseness which would be caused by its carrying or the like.

In such a very compact magnetic tape cassette proposed to have the above-described construction, a locking member is provided so that hubs on which a magnetic tape is wound are locked out of use and are unlocked during use. The locking member is always urged toward the hubs by a spring. When the magnetic tape is out of use, sharp-pointed projections provided on the locking member are located in contact with the hubs to keep the hubs from rotating. When the magnetic tape is in use, the sharp-pointed projections are separated from the hubs. However, as the component parts of the cassette are made smaller to render it compact, it becomes less easy to assemble the component parts. Since the locking member is urged by the spring when the locking member is attached in the assembly, it is troublesome to handle the locking member and the efficiency of the assembly is therefore degraded. Furthermore, the locking member is always urged toward the hubs (rearward of to the cassette) by the spring to lock the hubs. But, when the locking member is slid forward of the cassette through engagement with the guard panel at the time of opening of guard panel to unlock the hubs, the locking member is elastically deformed to make it unsure that the locking member is engaged with the guard panel. These are problems.

SUMMARY OF THE INVENTION

The present invention was made in order to solve the above-mentioned problems.

Accordingly, it is an object of the present invention to provide a magnetic tape cassette whose assembling property is improved and in which the locking and unlocking of hubs are made reliable.

In the magnetic tape cassette of the invention, a magnetic tape is wound on a pair of hubs. A slidable locking member is urged by a spring to lock the hubs. A rotatable guard panel opens and closes the front opening of the cassette.

A first aspect of the magnetic tape cassette is characterized in that the tip portions of a pair of arms belonging to the locking member and extending forward of the cassette have a receptacle-like engagement portion open at least on their upper sides. Thereof L-shaped engagement hooks are provided on the inside surfaces of both the side walls of the guard panel so that the tips of the hooks can be engaged in the receptacle-like engagement portions. The engagement hooks are engaged in the receptacle-like engagement portions by the opening motion of the guard panel to slide the locking member forward of the cassette.

A second aspect of the magnetic tape cassette of the invention is characterized in that the tip claws of a pair of the cassette locking member arms project inwardly of the cassette. Engagement hooks are provided on the inside surfaces of both the side walls of the guard panel and are located further to the inside the cassette, than the arms. The engagement hooks are engaged on the tip claws by the opening motion of the guard panel to slide the locking member forward of to the cassette.

Since, according to the first aspect, the locking member which is attached to the upper half case section of each of the magnetic tape cassettes of the present invention is urged rearward as to the cassette by the spring, the locking member can surely be kept displaced forward of the cassette by the guard panel so that the locking member is prevented from coming into contact with the hubs at the time of assembly of the cassette. Thus, a trouble such as the deviation of the positions of the hubs can be eliminated to facilitate the assembly of the cassette. For that reason, it is made easier to automate the assembly of the cassette to enhance the productivity.

According to the second aspect, the locking member and the guard panel are engaged with each other by inserting the engagement hooks into the engagement tip portions of the arms of the locking member or sandwiching the arms between the engagement hooks and the side walls of the guard panel. Therefore, lateral movement of the locking member in the rightward and leftward directions of each of the magnetic tape cassettes provided in accordance with the present invention is restricted. Accordingly troubles such as the unexpected disengagement of the engagement hooks and the locking member are thoroughly prevented to ensure the proper operation of the locking member.

BRIEF DESCRIPTION OF THE DRAWINGS

FIG. 1 shows a perspective exploded view of the upper half case section, locking member and guard panel of a magnetic tape cassette which is the first embodiment of the present invention.

FIG. 2 shows a perspective enlarged view of a major part of the magnetic tape cassette to indicate the state of engagement of the locking member and the guard panel.

FIG. 3 shows a perspective exploded view of the upper half case section, locking member and guard panel of a magnetic tape cassette which is the second embodiment of the present invention.

FIG. 4 shows a perspective enlarged view of a major part of the magnetic tape cassette shown in FIG. 3, to indicate the state of engagement of the locking member and the guard panel.

FIG. 5 shows a perspective enlarged view of a major part of another embodiment of the present invention.

DETAILED DESCRIPTION OF EXEMPLARY EMBODIMENTS

Embodiments of the present invention are hereafter described with reference to the drawings.

FIGS. 1 and 2 show the first embodiment which is a magnetic tape cassette.

FIG. 1 shows an exploded perspective view of the state of the magnetic tape cassette, in which a locking member 1 is not yet attached to an upper half casing section 2. A window member 3 is secured to the upper half case section 2 by ultrasonic fuse-bonding or the like. The window member 3 has a pair of support rims 4 located near the rear of the magnetic tape cassette to support the upper edges of two hubs not shown in the drawings. The window member 3 has a pair of narrow projections 11 located near the front of the cassette and extending in the front-to-rear direction of the cassette. Optical prisms 12 are provided on a pair of projecting portions of the window member 3, which extend to the tape passage ports of the front of the cassette for detecting the ends of the tape.

The locking member 1 has a flat portion 5, which slides on the window member 3 and includes a pair of recesses 7, in which the projections 11 are fitted. A pair of sharp-pointed backward projections 6 on the locking member are brought into contact with the peripheral edges of the hubs. A spring 9 for urging the locking member rearward of the magnetic tape cassette is fitted on a protrusion 8. The locking member 1 has arms 10 located at both its right and left sides which extend forward of the cassette casing section 2, along its side walls. The tip portions of the arms 10 act as engagement portions 20 having receptacle-like receivers 21, shown in FIG. 2. Although a width $l_1$ of the main portion of each arm 10 in the right-to-left direction of the magnetic tape cassette is relatively small, it is preferable that the width $l_2$ of each engagement portion 20 in that direction is large enough to make it easy to include the receivers 21 within that width $l_2$.

Returning to FIG. 1, a guard panel 15 for opening and closing the front opening of the magnetic tape cassette is supported so that the guard panel can be turned about turning shafts 17 provided on both the side walls 16 of the guard panel 15. Engagement hooks 18 appropriately extend from the tips of the turning shafts 17 nearly in parallel with the guard panel side walls 16.

When the magnetic tape cassette is assembled, the locking member 1 and the front panel 15 engaged with it are attached to the upper half case section 2 and this case section 2 is then overlaid on a lower half case section 2 in which both the hubs, a magnetic tape wound thereon, a friction sheet and so forth are already assembled. At that time, the locking member 1 is supported by the fit of the projections 11 of the case section 2 in the recesses 7 of the locking member 1 so that the locking member 1 can be slid along the upper half case section 2 backward and forward of the cassette. At the same time, the upper half case section 2 can be attached to the lower half case section as the locking member 1 remains slid forward despite the urging force of the spring 9 against a front wall 13 because the locking member 1 is linked to the guard panel 15 attached to the front portion of the upper half case section 2. In other words, the locking member 1 and the guard panel 15 have such constitution and operation, shown in FIG. 2, that the engagement hooks 18 provided on the turning shafts 17 are engaged with the engagement portions 20 of the arms 10. When the guard panel 15 in turned in the direction A so as to open, it slides the locking member 1 forward of the cassette 2. For that reason, when the upper half case section 2 is overlaid on the lower half case section in the assembly of the magnetic tape cassette, the sharp-pointed projections 6 of the locking member 1 are not engaged on the hubs, so that the hubs are not displaced by the unexpected engagement of the sharp-pointed projections on the hubs. The asembling property of the magnetic tape cassette is thereby improved. The assembly of the cassette is thus simplified to make it easy to assemble the cassette by using an automatic machine in particular, to enhance the productivity.

The operation of the locking member 1 mounted in the magnetic tape cassette is now described. When the cassette is loaded in a recording/reproduction device so that the guard panel 15 at the front of the cassette is turned, the locking member 1 is slid forward by the engagement of its engagement hooks 18 in the engagement portions 20 of the arms 10, against the opposing rearward urging force of the spring 9 on the front wall 13 of the upper half case section 2, to thereby unlock the hubs. When the locking member 1 is being slid forward and when the hubs are unlocked from the locking member, a tensile force acts between the tip portion of each arm 10 of the locking member and the spring protrusion 8 thereof. A component of the tensile force acts as if it would deform the locking member 1. However, since each engagement hook 18 is located in the engagement portion 20 of the arm 10 as shown in FIG. 2, a trouble such as the unexpected disengagement of the engagement portion 20 from the engagement hook 18 is prevented to ensure the proper operation of the locking member 1.

FIGS. 3 and 4 shows the second embodiment of the magnetic tape cassette. The same reference symbols in FIGS. 1, 2, 3 and 4 denote the same component parts. The difference of the second embodiment from the first embodiment if that the tip end portions of both the arms 10 of the locking member 1 are provided with claws 10a oriented inward in the second embodiment.

The operation of the locking member 1 mounted in the magnetic tape cassette shown in FIGS. 3 and 4 is now described. When the cassette is loaded in a recording/reproduction device so that a guard panel 15 at the front of the cassette is turned outward, the locking member 1 is slid forward of the cassette through the engagement of engagement hooks 18 and the claws 10*a* of the arms 10, against the rearward urging force of a spring 9 on the front wall 13 of the upper half case section, to thus unlock the hubs. When the locking member 1 is slid forward of the cassette and when the hubs are unlocked from the locking member 1, a tensile force acts between the tip portion of each arm 10 and the protrusion 8 and a component of the tensile force acts as if it would deform the locking member. However, since the arm 10 is located between the side wall 16 of the guard panel 15 and the engagement hook 18 as shown in FIG. 4, a trouble such as the unexpected disengagement of the claw 10a and the engagement hook is prevented to ensure the proper operation of the locking member 1.

Although the locking member 1 is supported by fitting the projections 11 of the window member 3 in the recesses 7 of the flat portion 5 of the locking member 1 in each of the first and the second embodiments, the present invention is not confined thereto but may be otherwise embodied. For example, the locking member 1 may be supported by slidably supporting its flat portion between the window member and the upper half case section 2.

Although the engagement hooks 18 are provided on the turning shafts 17 in each of the first and the second embodiments, the present invention is not confined thereto but may be otherwise embodied. In other words, the location and form of each engagement hook 18 are not particularly confined, as far as the hook is provided on the inside surface of the side wall 16 of the guard panel 15 so as to be engaged with the engagement portion 20 or the claw 10*a* to slide the locking member 1 forward as to the cassette.

Each embodiment of the present invention is not confined to have the engagement portions 20 or the claws 10a shown in FIGS. 2 and 4. The present invention may be otherwise embodied so that the tip portion of each arm 10 is shaped in a U or a V shape and sandwiches the engagement hook 18 in the right-to-left direction of the cassette. Also, the engagement portions 20 may be shaped like a hand, as shown in FIG. 5, with a forwardly extend finger. This design is compromise between the embodiments of FIGS. 2 and 4.

What is claimed is:

1. A magnetic tape cassette, comprising:
   a pair of hubs on which a magnetic tape is wound;
   a slidable locking member which is urged rearward of said cassette by a spring to lock said hubs and which has a pair of arms extending forward of said cassette;
   a rotatable guard panel for opening and closing a front opening of said cassette and having two lateral side walls;
   engagement means provided at free-end tips of both said arms;
   engagement hooks provided inside both of said side walls of said guard panel so that said engagement hooks are engaged with said engagement means by the opening motion of said guard panel to slide said locking member forward of said cassette;
   and wherein said guard panel includes rotation shafts projecting respectively from said lateral side walls of said panel, and wherein said engagement hooks extend from the tips of said rotation shafts along respective lateral side walls of said panel.

2. A magnetic tape cassette according to claim 1, wherein said cassette comprises a casing section having opposite side walls and wherein said engagement means are claws projecting inwardly of said side walls of said cassette casing section and wherein said engagement hooks are located to the inside of of respective ones of said arms.

3. A magnetic tape cassette according to claim 2, wherein said engagement means further comprises fingers attached to free ends of said claws and extending rearwardly of said cassette.

4. A magnetic tape cassette according to claim 1, in which said engagement means are receptacle-like engagement tip portions attached to said arms and which are open at least on upper sides of said engagement tip portions and said engagement hooks project into said open upper sides of said engagement tip portions during rotation of said rotation shafts.

* * * * *